United States Patent [19]

Kallies et al.

[11] Patent Number: 5,577,781
[45] Date of Patent: Nov. 26, 1996

[54] APPARATUS FOR LOCKING AN AIRCRAFT DOOR

[75] Inventors: Guenter Kallies; Wolfgang Lessat-Kaupat, both of Hamburg; Thomas Luebbe, Schenefeld, all of Germany

[73] Assignee: Daimler-Benz Aerospace Airbus GmbH, Hamburg, Germany

[21] Appl. No.: 377,415

[22] Filed: Jan. 24, 1995

[30] Foreign Application Priority Data

Jan. 24, 1994 [DE] Germany .................. 44 01 899.1

[51] Int. Cl.⁶ .................................................. E05C 3/06
[52] U.S. Cl. .................. 292/195; 292/DIG. 65; 244/129.5; 49/394
[58] Field of Search .................. 292/195, DIG. 41, 292/DIG. 65, 138, 144; 70/92, 93, DIG. 48; 244/129.4, 129.5; 73/262, 263, 264, 243; 49/334, 340, 394

[56] References Cited

U.S. PATENT DOCUMENTS

| | | | |
|---|---|---|---|
| 4,042,193 | 8/1977 | Cerne | 244/129.1 |
| 4,473,201 | 9/1984 | Barnes et al. | 244/129.5 |
| 4,552,326 | 11/1985 | Bokalot | 244/129.5 |
| 4,706,685 | 11/1987 | Jones, Jr. et al. | 128/725 |
| 4,720,065 | 1/1988 | Hamatani | 244/129.5 |
| 4,978,089 | 12/1990 | Alquier et al. | 244/129.5 |
| 5,305,969 | 4/1994 | Odell et al. | 244/129.5 |
| 5,337,977 | 8/1994 | Fleming et al. | 244/129.5 |

*Primary Examiner*—Steven N. Meyers
*Assistant Examiner*—Donald J. Lecher
*Attorney, Agent, or Firm*—W. G. Fasse; W. F. Fasse

[57] ABSTRACT

An apparatus for locking an aircraft door provided in the outer wall of an aircraft includes at least one locking shaft pin that locks the aircraft door in a fixed, closed position relative to the outer wall of the aircraft when the locking shaft pin is positioned or rotated into a locking position. The locking shaft pin is connected to a mechanical linkage forming a positioning arrangement. The positioning arrangement is coupled to a control element, which essentially includes a membrane connected to a control rod. The membrane is arranged within a housing so as to form an interior air chamber on one side of the membrane and an exterior air chamber on the other side of the membrane. The air pressure of the cabin interior is applied to the interior air chamber through an interior air pressure port, and the exterior ambient air pressure is applied to the exterior air chamber through an exterior air pressure port. A pressure differential on the two opposite sides of the membrane causes the membrane to deflect and move the control rod, which is coupled to the positioning arrangement.

16 Claims, 3 Drawing Sheets

APPARATUS FOR LOCKING AN AIRCRAFT DOOR

FIELD OF THE INVENTION

The invention relates to an apparatus for locking an aircraft door that is arranged within the outer fuselage wall of the aircraft and that includes at least one locking shaft pin. When it is in a locking position, the locking shaft pin securely fixes the aircraft door relative to the outer wall of the aircraft. The locking shaft pin is connected to a positioning arrangement for moving the locking shaft pin into the locking position or the unlocking position.

BACKGROUND INFORMATION

Locking mechanisms in the above-described general field are used to prevent the uncontrolled or unintentional opening of the aircraft doors, for example, when the aircraft is in flight. However, after the aircraft has landed, the problem can arise that the air pressure existing inside the aircraft is higher than the external ambient air pressure. Because aircraft doors generally swing outward when they are opened, the danger exists that the increased air pressure inside the aircraft can rapidly and powerfully push the door outward as soon as it is unlocked. Considerable forces are applied to the door, because it has a relatively large surface area being acted on by the increased air pressure, so that the door can be caused to burst open suddenly.

Such a sudden bursting-open of the aircraft door is quite dangerous and entails a great risk of causing accidents and injuries, because the aircraft crew member or other person who is opening the door typically would not expect the door to burst open in such a manner. Opening the aircraft door from the outside is especially dangerous in such a case, because the person opening the door from the outside would usually be standing directly in front of the door, and would very likely get hit by the door if it would suddenly burst open.

OBJECTS OF THE INVENTION

In view of the above it is the aim of the invention to achieve the following objects singly or in combination:

to provide an apparatus for locking an aircraft door that aims to ensure that the door remains locked and cannot be opened whenever a predefined threshold pressure difference between the aircraft interior and the exterior environment is exceeded;

to provide such an apparatus for locking an aircraft door that aims to prevent the uncontrolled opening of the aircraft door whenever an unacceptable pressure differential exists between the aircraft interior and the exterior environment;

to construct such an apparatus using pneumatic and mechanical elements that are pneumatically actuated by a pressure differential without requiring electrical or electronic components;

to provide a simple and robust construction for such an apparatus that functions reliably with minimal maintenance even under severe application conditions; and to allow a threshold pressure differential value at which the door is to remain locked to be selectable or adjustable.

SUMMARY OF THE INVENTION

The above objects have been achieved in a door locking apparatus according to the invention, wherein the positioning arrangement that actuates or positions the locking shaft pins is connected to a control element. The control element essentially comprises at least one membrane arranged within a housing chamber and a control rod connected to the membrane. The membrane divides the chamber within the housing to form two separate chambers on opposite sides of the membrane. The air pressure of the cabin interior is provided to one of the chambers through an interior air pressure port, and the exterior air pressure outside of the aircraft cabin is provided to the other chamber through an exterior air pressure port.

The membrane moves in response to the pressure differential between the cabin interior air pressure applied to one side of the membrane and the exterior or ambient air pressure applied to the other side of the membrane. The motion of the membrane is conveyed further by the control rod that is connected to the membrane, and thereby transmitted to the positioning arrangement. Thus, according to the preferred embodiment, the control element is constructed in the form of a differential pressure capsule. In this manner, the invention provides a pneumatic-mechanical locking apparatus that operates without requiring any electrical or electronic components. Through such a construction, a high operation reliability can be assured even under extreme or rough installation conditions.

In the pneumatic-mechanical locking arrangement according to the invention, the control rod is connected to a locking rod linkage that forms a part of the positioning arrangement. In order to minimize the expense and effort involved with the locking apparatus, the locking rod linkage is preferably connected to the control element through a journal coupling element. Thereby, the control element may be embodied as an auxiliary component that can be installed originally in new aircraft, or can be retrofitted in existing aircraft.

In the control element according to the invention, the membrane develops a resultant positioning force corresponding to the arising pressure differential, and that force is directly conveyed to the locking arrangement, so that a direct coupling of the force is ensured. In this manner, the invention avoids potential negative influences or interference that could arise with longer or more complex force transmission mechanisms. Moreover, the combination of the membrane and the control rod according to the invention provides a very simple construction, which is resistant to wear and other interfering influences.

By appropriately dimensioning the functional elements of the apparatus, a desired threshold value of pressure differential can be selected. The threshold value of the pressure differential can also be adjusted by arranging a spring having a selected spring force on the positioning arrangement so as to counteract the effective membrane force. In this manner a selected and defined beginning of the unlocking process can be ensured. In other words, it can be ensured that an unlocked operating condition exists whenever the pressure differential is acceptable, i.e. below the prescribable threshold value, and that a locked operating condition exists whenever the pressure differential is unacceptable, i.e. above the prescribable threshold value.

In order to provide a large positioning force relative to the structural size of the control element, the control element preferably includes at least two membranes arranged next to each other in the direction of the lengthwise axis of the control rod. To adapt the locking function to typical operating conditions, the membrane is preferably dimensioned so that it provides the necessary positioning force for actuating or repositioning the locking shaft pin at a pressure differential of approximately 2.5 mbar. Moreover, the membrane preferably has a surface area sufficient to develop a maximum positioning force of 4 Newtons.

As is well known in the art, the force exerted (F) is given by the product of the pressure differential (P) across the membrane and the surface area (A) of the membrane, i.e. F=P×A. Thus, the required membrane area can be easily calculated for any desired operating condition of a given operating pressure differential and a specified positioning force that is required to be produced at that pressure differential. The pressure at which the maximum deflection of the membrane is achieved can also readily be calculated from the parameters of the apparatus, such as the known spring characteristics of the counter spring, or can be determined by routine experimentation.

In order to avoid damage or other negative influences on the functionality of the control element at high differential pressures, for example on the order of 1.2 bar, the housing chamber preferably includes an inner surface that contacts and supports the membrane when the membrane is in a position of maximum deflection or maximum positioning force.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
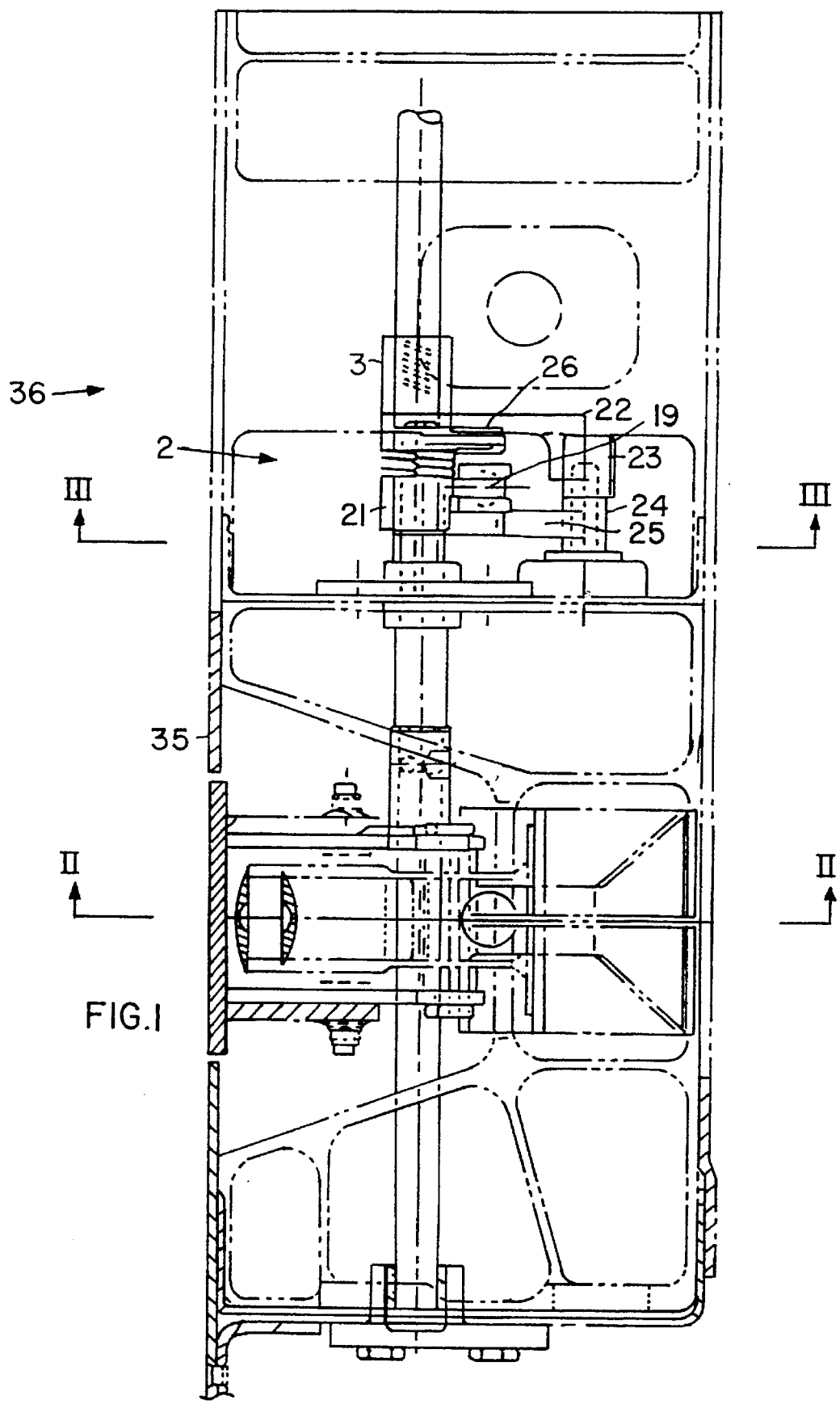
FIG. 1 shows a horizontal section through an aircraft wall including the locking apparatus according to the invention (state with pressure differential)
Figure 2:
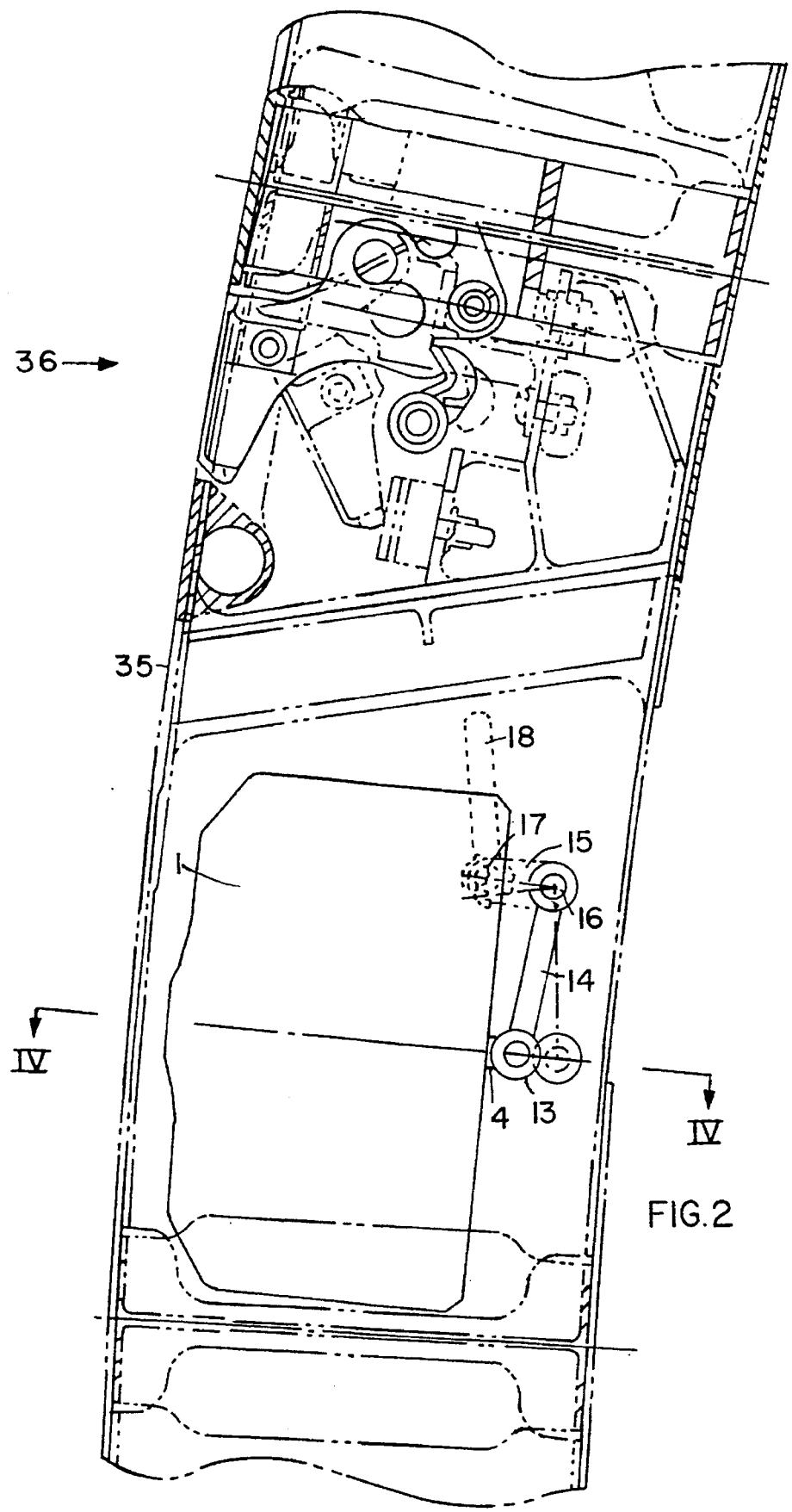
FIG. 2 shows a vertical section along the section line II—II in FIG. 1 (state with pressure differential)

FIGS. 1 and 2 show a general overview of the components of the apparatus of the invention installed in an aircraft door 35, which is received in and generally forms a part of an aircraft wall 36. The apparatus for locking the aircraft door according to the invention essentially comprises a control element 1 coupled to a positioning arrangement 2 for positioning a locking shaft pin 3, which selectively locks or unlocks the aircraft door 35. That is to say, the positioning arrangement 2 moves the locking shaft pin 3 selectively between locked and unlocked positions, whereby the door may be locked closed or unlocked so that it may be opened.

Figure 4:
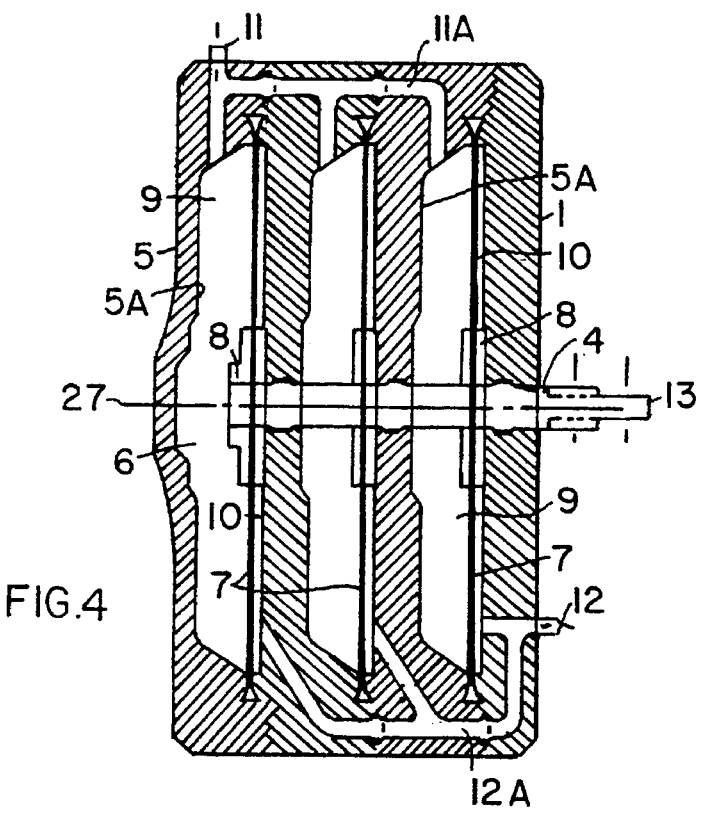
FIG. 4 is an enlarged detail view of a cross section through a control element according to the invention (state without pressure differential), taken along the section line IV—IV in FIG. 2.

The detailed construction of the control element 1 in the form of a differential pressure capsule 1 is shown in FIG. 4. A control rod 4 is supported and guided to be axially slidable in a housing 5 of the control element 1. The housing 5 encloses at least one, but preferably several housing chambers 6. A respective membrane 7 is arranged in each housing chamber 6 so as to divide each housing chamber 6 into a respective exterior air chamber 9 and a respective interior air chamber 10. Each membrane is attached to the housing 5 around its peripheral edges to form an airtight seal between the respective exterior air chamber 9 and interior air chamber 10. Each of the membranes 7 is mounted on the control rod 4 by a respective membrane mounting disk 8. The membranes may be made of various plastic materials having sufficient flexibility, and are preferably made of rubber alone or in a composite including plastic or metal.

An exterior air pressure port 11 is connected to each of the exterior air chambers 9 through respective exterior air tubes 11A, so as to pressurize the exterior air chambers 9 to the air pressure outside of the aircraft cabin. An interior air pressure port 12 is connected to each of the interior air chambers 10 by corresponding interior air tubes 12A, so as to pressurize the interior air chambers 10 to the cabin pressure.

Preferably, each of the housing chambers 6 is dimensioned and shaped in such a manner that a chamber wall 5A of the housing 5 defines a maximum stroke or deflection of each membrane 7, at which the membrane 7 will at least partially rest against the chamber wall 5A. In this manner, the membranes 7 are protected against damage that might otherwise occur if a very high pressure differential, for example 1.2 bar, is applied between the interior air chambers 10 and the exterior air chambers 9.

As shown in FIG. 4, it is possible to provide a plurality, for example three membranes 7, to provide the necessary positioning forces involved in positioning, i.e. rotating, and blocking or unblocking of the locking shaft pin 3. Particularly, a plurality of membranes 7 can be arranged one behind the other in the direction of the lengthwise axis 27 of the control rod 4 so as to provide an increased effective membrane surface and therewith an increased effective positioning force in a very compact embodiment of the control element 1. The plurality of membranes 7 are respectively arranged in a corresponding plurality of housing chambers 6 as described above. Alternatively, a single membrane could be used, having the necessary membrane surface area to provide the required positioning forces.

As shown particularly in FIG. 2, the end of the control rod 4 protruding from the control element 1 is connected through a journal coupling 13 to one end of a rocker arm lever 14, of which the opposite end is rigidly connected to a second rocker arm lever 15. At the area of their interconnection, the rocker arm levers 14 and 15 are together rotatably mounted on a journal bearing shaft 16 that is connected to the structure of the aircraft. The opposite end, namely the free end, of the second rocker arm lever 15 is connected through a journal coupling 17 to one end of a main push rod 18 which is thereby driven to make stroking motions corresponding to the rotational rocking motions of the second rocker arm lever 15. In this manner, the movements of the control rod 4 are coupled into the positioning arrangement 2, which is shown in detail in FIG. 3.

Figure 3:
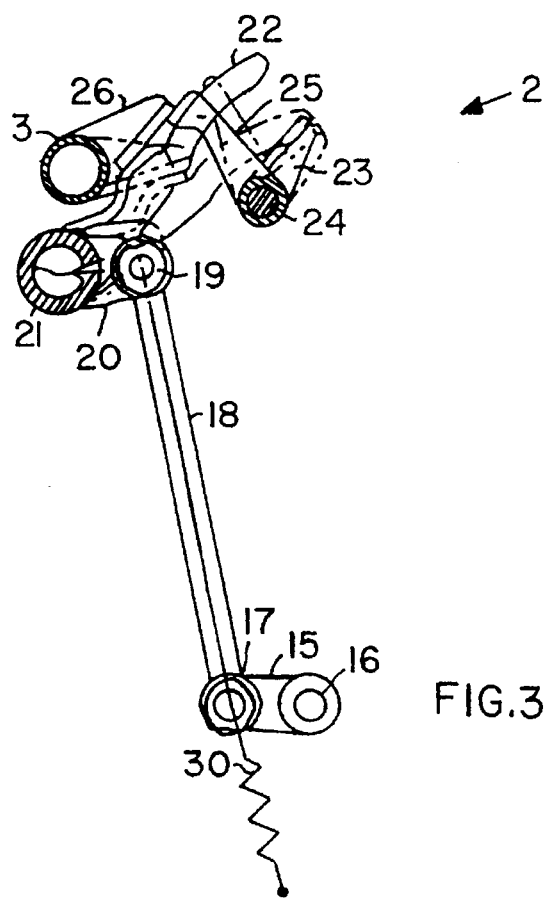
FIG. 3 is an enlarged detail view of a vertical section along the section line III—III in FIG. 1 (state with pressure differential)

As shown in FIG. 3, the second or upper end of the main push rod 18 is connected through a journal coupling 19 to a rotatable lever 20, which is rigidly mounted on an operating shaft pin 21. The operating shaft pin 21 is rotatably supported so that it is caused to rotate or rock about its lengthwise axis when the rotatable lever 20 is caused to rotate or rock by the stroking motion of the main push rod 18. A trip finger 22 is mounted on the operating shaft pin 21 so that it rotates or rocks with the rotation or rocking motion of the operating shaft pin 21.

The trip finger 22 cooperates with a positioning lever 26 mounted on the locking shaft pin 3, so that a counterclockwise motion of the trip finger 22 can rotate the positioning lever 26 and therewith the locking shaft pin 3 in a counterclockwise direction into a locked position (shown by solid lines). The trip finger 22 also cooperates, in the clockwise direction, with a tilting lever 23, which is secured to an auxiliary shaft 24 so that the auxiliary shaft 24 is rotated by the rotating movement of the tilting lever 23. A blocking lever 25 is rigidly mounted on the auxiliary shaft 24, so that the rotating or rocking motion of the auxiliary shaft 24 correspondingly moves the blocking lever 25 to selectively block or unblock the motion of the positioning lever 26 mounted on the locking shaft pin 3.

In the blocking position (shown by solid lines), the blocking lever 25 engages the positioning lever 26 and thereby prevents rotation of the locking shaft pin 3 out of the locked position (shown by solid lines) and into an unlocked position (shown by dashed lines). On the other hand, in the unblocked position (shown by dashed lines), the blocking lever 25 is out of engagement with the positioning lever 26, i.e. the positioning lever 26 is released, so that the locking shaft pin 3 can be rotated clockwise from the locked position to the unlocked position so as to unlock the aircraft door.

Thus, when the pressure differential between the interior cabin air pressure and the exterior ambient air pressure increases to exceed the threshold value, the membrane 7 moves the control lever 4 and therewith the main push rod 18, so as to correspondingly move the trip finger 22 counterclockwise to rotate the positioning lever 26 and therewith the locking shaft pin 3 counterclockwise into a locked position. On the other hand, when the pressure differential decreases below the threshold value, the trip finger 22 is moved clockwise so as to move the tilting lever 23 and therewith the blocking lever 25 clockwise to unblock the rotation of the positioning lever 26 and the locking shaft pin 3 and thereby allow the door to be unlocked and opened.

A spring 30, which is shown schematically in FIG. 3, can be arranged to bias the positioning arrangement 2, for example biasing the main push rod 18, against the operating force applied by the membrane 7. The biasing force of the spring 30 can be selected or adjusted to select or adjust the threshold pressure difference. As would be evident to those skilled in the present art, additional springs can be used as necessary to bias the motion of various ones of the elements described herein. Such springs are not shown for the sake of clarity.

Although the invention has been described with reference to specific example embodiments, it will be appreciated that it is intended to cover all modifications and equivalents within the scope of the appended claims.

What is claimed is:

1. An apparatus for locking an aircraft door provided in an outer wall of an aircraft having a pressurizable cabin, said apparatus comprising a locking shaft pin arranged to be movable between a locked position in which said door is fixed relative to said outer wall and an unlocked position in which said door is released, a control element, and a positioning arrangement coupled between said control element and said locking shaft pin, wherein said control element comprises a control rod and a membrane connected to said control rod, and wherein said membrane is arranged to have an interior air pressure existing inside said cabin impinge on a first side of said membrane and an exterior air pressure existing outside said cabin impinge on a second side of said membrane, wherein said positioning arrangement comprises a locking linkage coupled to said control rod, and wherein said locking linkage comprises a rotationally rockable positioning lever rigidly connected to said locking shaft pin and a blocking lever driven by motions of said control rod to alternatively block and unblock a rotational rocking motion of said positioning lever.

2. The apparatus of claim 1, wherein said control element further comprises a housing in which said membrane is mounted to form and separate from each other an interior air chamber at said first side of said membrane and an exterior air chamber at said second side of said membrane, an interior air pressure port communicating said interior air pressure to said interior air chamber, and an exterior air pressure port communicating said exterior air pressure to said exterior air chamber, and wherein said control rod is axially slidably supported in said housing.

3. The apparatus of claim 2, wherein said control element comprises at least two of said membranes arranged on said control rod next to one another in a direction parallel to a lengthwise axis of said control rod, and wherein a respective plurality of interior air chambers and exterior air chambers are formed in said housing and respectively separated from one another by said membranes.

4. The apparatus of claim 2, wherein said control element is a differential pressure capsule.

5. The apparatus of claim 2, wherein said housing comprises a housing wall that partly bounds said exterior air chamber, and wherein said membrane lies against an inner surface of said housing wall at a position of maximum deflection of said membrane.

6. The apparatus of claim 5, wherein said membrane has means such that said maximum deflection is achieved at a pressure difference of about 1.2 bar between said interior air pressure and said exterior air pressure.

7. The apparatus of claim 2, wherein said exterior air pressure is an ambient static exterior air pressure, and said exterior air pressure port is a static exterior air pressure port.

8. The apparatus of claim 1, wherein said membrane has means such that said membrane provides a necessary force for actuating said positioning arrangement at a pressure difference of about 2.5 mbar between said interior air pressure and said exterior air pressure.

9. The apparatus of claim 1, wherein said membrane has means so as to apply a maximum force of 4 Newtons to said control rod.

10. The apparatus of claim 9, wherein said membrane has means to provide said maximum force at a pressure difference of about 1.2 bar between said interior air pressure and said exterior air pressure.

11. The apparatus of claim 1, wherein said locking linkage further comprises a journal coupling that connects said locking linkage to said control rod.

12. The apparatus of claim 1, wherein said positioning arrangement further comprises a spring connected to said locking linkage to bias said linkage against a force applied by said membrane.

13. The apparatus of claim 1, wherein said locking linkage further comprises a two-armed rocker lever including a first rocker arm with a first journal coupling at a free end thereof connected to said control rod and including a second rocker arm with a second journal coupling at a free end thereof, a push-pull rod connected to said second journal coupling, a rotationally rockable operating shaft pin connected off-axis thereof with said push-pull rod, a trip finger rigidly mounted on said operating shaft pin, a rotationally rockable auxiliary shaft, and a tilting lever rigidly mounted on said auxiliary shaft and rotationally drivable by said trip finger, and wherein said blocking lever is rigidly mounted on said auxiliary shaft.

14. The apparatus of claim 13, wherein said trip finger is arranged to selectively contact said positioning lever to move said positioning lever in at least one rocking direction of said rotational rocking motion of said positioning lever.

15. The apparatus of claim 1, wherein said locking linkage is so arranged and coupled to said control rod so that said blocking lever blocks said rotational rocking motion of said positioning lever only when said interior air pressure is higher than said exterior air pressure and a pressure differential therebetween exceeds a threshold pressure differential.

16. The apparatus of claim 1, wherein said membrane is a flexible membrane.

* * * * *